United States Patent
Tamura et al.

(10) Patent No.: US 12,384,405 B2
(45) Date of Patent: Aug. 12, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takao Tamura, Wako (JP); Sho Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/676,868

(22) Filed: Feb. 22, 2022

(65) Prior Publication Data

US 2022/0266857 A1 Aug. 25, 2022

(30) Foreign Application Priority Data

Feb. 25, 2021 (JP) .................................. 2021-028473

(51) Int. Cl.
*B60W 60/00* (2020.01)
*G01C 21/30* (2006.01)
(Continued)

(52) U.S. Cl.
CPC ........ *B60W 60/001* (2020.02); *B60W 60/005* (2020.02); *G01C 21/30* (2013.01);
(Continued)

(58) Field of Classification Search
CPC ............. B60W 60/001; B60W 60/005; B60W 2420/42; B60W 2420/52; B60W 2552/53;
(Continued)

(56) References Cited

U.S. PATENT DOCUMENTS 10,984,551 B2 * 4/2021 Shikimachi ............... G06T 7/74
11,167,758 B2 * 11/2021 Fukushige ........... G06V 20/588
(Continued)

FOREIGN PATENT DOCUMENTS

CN 110494903 11/2019
CN 112319502 2/2021
(Continued)

OTHER PUBLICATIONS

Machine Translation DE-112017001175-T5 (Year: 2018).*
(Continued)

*Primary Examiner* — Jean Paul Cass
(74) *Attorney, Agent, or Firm* — Amin, Turocy & Watson, LLP (57) ABSTRACT

A device recognizes road lane markings and outputs first left road lane markings and first right road lane markings, recognizes the road lane markings based on map information and outputs second left road lane markings and second right road lane markings, determines deviations between first left road lane markings and second left road lane markings and deviations between first right road lane markings and second right road lane markings, determines that deviations are present only in one of the first left road lane markings and the second left road lane markings and the first right road lane markings and the second right road lane markings, sets a position at which a predetermined width is offset as a center of a travel path on which the vehicle is to travel in the future, and generates the travel path based on the center of the travel path.

7 Claims, 7 Drawing Sheets

(51) Int. Cl.
  *G05D 1/00* (2024.01)
  *G06V 20/56* (2022.01)
(52) U.S. Cl.
  CPC ......... *G05D 1/0214* (2013.01); *G05D 1/0234* (2013.01); *G05D 1/0274* (2013.01); *G06V 20/588* (2022.01); *B60W 2420/403* (2013.01); *B60W 2420/408* (2024.01); *B60W 2552/53* (2020.02); *B60W 2554/4041* (2020.02)
(58) Field of Classification Search
  CPC ......... B60W 2554/4041; B60W 30/12; B60W 40/06; G01C 21/30; G01C 21/32; G01C 21/3407; G01C 21/3602; G05D 1/0214; G05D 1/0234; G05D 1/0274; G06V 20/588; G06V 10/764
  See application file for complete search history.

(56) References Cited

U.S. PATENT DOCUMENTS

| | | | |
|---|---|---|---|
| 2014/0050362 A1 | 2/2014 | Park et al. | |
| 2015/0367778 A1 | 12/2015 | Vladimerou et al. | |
| 2019/0035110 A1 | 1/2019 | Shikimachi | |
| 2020/0026297 A1* | 1/2020 | Kato | B60W 60/001 |
| 2020/0051436 A1 | 2/2020 | Ochida et al. | |
| 2020/0094837 A1* | 3/2020 | Kato | B60W 30/12 |
| 2021/0009127 A1* | 1/2021 | Horiba | B60W 50/0097 |
| 2021/0031804 A1 | 2/2021 | Oyama | |
| 2021/0224556 A1* | 7/2021 | Xu | G06V 20/41 |
| 2022/0161794 A1* | 5/2022 | Kakeda | B60W 60/0059 |
| 2024/0199010 A1* | 6/2024 | Shimizu | B60W 30/12 |
| 2024/0428448 A1* | 12/2024 | Lin | G06T 7/74 |
| 2025/0076070 A1* | 3/2025 | Lin | G01C 21/3658 |

FOREIGN PATENT DOCUMENTS

| | | | |
|---|---|---|---|
| DE | 112017001175 T5 * | 11/2018 | G01C 21/28 |
| JP | 2008-049918 | 3/2008 | |
| JP | 2013-097714 | 5/2013 | |
| JP | 2017-520056 | 7/2017 | |
| JP | 2017-165309 | 9/2017 | |
| JP | 2019-040390 | 3/2019 | |
| JP | 2019-048570 | 3/2019 | |
| JP | 2019-053596 | 4/2019 | |
| JP | 2020-163870 | 10/2020 | |
| JP | 2021-026693 | 2/2021 | |

OTHER PUBLICATIONS

Japanese Office Action for Japanese Patent Application No. 2021-028473 dated Dec. 6, 2022.
Chinese Office Action for Chinese Patent Application No. 202210159253.8 mailed Nov. 29, 2024.

* cited by examiner

| DRIVING MODE | CONTROL STATE | TASK |
|---|---|---|
| MODE A | AUTOMATED DRIVING | FRONT MONITORING: UNNECESSARY<br>STEERING GRIPPING: UNNECESSARY |
| MODE B | DRIVING ASSISTANCE | FRONT MONITORING: NECESSARY<br>STEERING GRIPPING: UNNECESSARY |
| MODE C | DRIVING ASSISTANCE | FRONT MONITORING: NECESSARY<br>STEERING GRIPPING: NECESSARY |
| MODE D | DRIVING ASSISTANCE | FRONT MONITORING: NECESSARY<br>AT LEAST CERTAIN DEGREE OF DRIVING OPERATION IS NECESSARY |
| MODE E | MANUAL DRIVING | FRONT MONITORING: NECESSARY<br>BOTH STEERING AND ACCELERATION/DECELERATION REQUIRE DRIVING OPERATIONS |

↑ TASK: LIGHT

↓ TASK: HEAVY

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2021-028473, filed Feb. 25, 2021, the entire contents of which is incorporated herein by reference.

BACKGROUND

Field of the Invention

The present invention relates to a vehicle control device, a vehicle control method, and a storage medium.

Description of Related Art

Research is underway on the control of automated driving in a case where lane markings of a lane in which a vehicle is traveling cannot be detected. For example, Japanese Unexamined Patent Application, First Publication No. 2019-53596 discloses a technique in which vehicle travel control is performed on the basis of a smaller width out of a width of a road specified on the basis of surroundings information acquired by a first acquirer and a width of the road indicated by information regarding the road acquired by a second acquirer.

SUMMARY

In the technique of the related art, a smaller road width is always selected regardless of the correctness of the acquired information. As a result, in a case where the selected information is incorrect, inappropriate vehicle travel control may be performed.

The present invention has been made in consideration of such circumstances, and one object thereof is to provide a vehicle control device, a vehicle control method, and a storage medium capable of more appropriately performing vehicle travel control.

A vehicle control device, a vehicle control method, and a storage medium according to the present invention have the following configurations.

(1): According to an aspect of the present invention, there is provided a vehicle control device including a storage device that stores a program; and a hardware processor, in which the hardware processor executes the program stored in the storage device to recognize a pair of left and right road lane markings that divides a lane in which a vehicle is located on the basis of an output from a detection device that detects a surrounding situation of the vehicle, and output the left and right road lane markings as a first left road lane marking and a first right road lane marking, respectively, recognize a pair of left and right road lane markings that divides the lane in which the vehicle is located on the basis of map information, and output the left and right road lane markings as a second left road lane marking and a second right road lane marking, respectively, determine whether or not there is a deviation between the first left road lane marking and the second left road lane marking, and determine whether or not there is a deviation between the first right road lane marking and the second right road lane marking, in a case where it is determined that a deviation is present only in one of a pair of the first left road lane marking and the second left road lane marking and a pair of the first right road lane marking and the second right road lane marking, set a position at which a predetermined width is offset from the other of the pair of the first left road lane marking and the second left road lane marking and the pair of the first right road lane marking and the second right road lane marking to the one pair, as a center of a travel path on which the vehicle is to travel in the future, generate the travel path on the basis of the center of the travel path, and set the predetermined width on the basis of a smaller width out of a width between the first left road lane marking and the first right road lane marking and a width between the second left road lane marking and the second right road lane marking.

(2): In the above aspect (1), the hardware processor determines whether or not a deviation is present on the basis of a deviation amount between the first left road lane marking and the second left road lane marking, the hardware processor determines whether or not a deviation is present on the basis of a deviation amount between the first right road lane marking and the second right road lane marking, and the deviation amount is an amount related to a lateral distance between the first left road lane marking and the second left road lane marking, an angle between the first left road lane marking and the second left road lane marking, a lateral distance between the first right road lane marking and the second right road lane marking, or an angle between the first right road lane marking and the second right road lane marking.

(3): In the above aspect (2), the hardware processor determines that a deviation is present in a case where the deviation amount is equal to or more than the threshold value, and the hardware processor sets the threshold value on the basis of an amount of change in curvature of the first left road lane marking or the first right road lane marking.

(4): In the above aspect (1), the hardware processor controls steering and acceleration/deceleration of the vehicle regardless of an operation of a driver of the vehicle, a driving mode of the vehicle is determined to be one of a plurality of driving modes including a first driving mode and a second driving mode, the second driving mode being a driving mode in which a task imposed on the driver is light compared with the first driving mode, some of the plurality of driving modes including at least the second driving mode being controlled by the hardware processor, and, in a case where a task related to the determined driving mode is not being executed by the driver, the driving mode of the vehicle being changed to a driving mode in which the task is heavier, and the hardware processor continues the second driving mode in a case where the driving mode of the vehicle is the second driving mode and the hardware processor generates the travel path.

(5): In the above aspect (4), the hardware processor recognizes a traveling trajectory of a preceding vehicle, and, in a case where the recognized traveling trajectory intersects the first left road lane marking or the first right road lane marking, the hardware processor changes the driving mode of the vehicle from the second driving mode to the first driving mode.

(6): According to another aspect of the present invention, there is provided a vehicle control method of causing a computer mounted in a vehicle to recognize a pair of left and right road lane markings that divides a lane in which the vehicle is located on the basis of an output from a detection device that detects a surrounding situation of the vehicle, and output the left and right road lane markings as a first left road lane marking and a first right road lane marking, respectively; recognize a pair of left and right road lane markings that divides the lane in which the vehicle is located on the basis of map information, and output the left and right road lane markings as a second left road lane marking and a second right road lane marking, respectively; determine whether or not there is a deviation between the first left road lane marking and the second left road lane marking, and determine whether or not there is a deviation between the first right road lane marking and the second right road lane marking; in a case where it is determined that a deviation is present only in one of a pair of the first left road lane marking and the second left road lane marking and a pair of the first right road lane marking and the second right road lane marking, set a position at which a predetermined width is offset from the other of the pair of the first left road lane marking and the second left road lane marking and the pair of the first right road lane marking and the second right road lane marking to the one pair, as a center of a travel path on which the vehicle is to travel in the future; generate the travel path on the basis of the center of the travel path; and set the predetermined width on the basis of a smaller width out of a width between the first left road lane marking and the first right road lane marking and a width between the second left road lane marking and the second right road lane marking.

(7): According to still another aspect of the present invention, there is provided a non-transitory computer readable medium storing a program causing a computer mounted in a vehicle to recognize a pair of left and right road lane markings that divides a lane in which the vehicle is located on the basis of an output from a detection device that detects a surrounding situation of the vehicle, and output the left and right road lane markings as a first left road lane marking and a first right road lane marking, respectively; recognize a pair of left and right road lane markings that divides the lane in which the vehicle is located on the basis of map information, and output the left and right road lane markings as a second left road lane marking and a second right road lane marking, respectively; determine whether or not there is a deviation between the first left road lane marking and the second left road lane marking, and determine whether or not there is a deviation between the first right road lane marking and the second right road lane marking; in a case where it is determined that a deviation is present only in one of a pair of the first left road lane marking and the second left road lane marking and a pair of the first right road lane marking and the second right road lane marking, set a position at which a predetermined width is offset from the other of the pair of the first left road lane marking and the second left road lane marking and the pair of the first right road lane marking and the second right road lane marking to the one pair, as a center of a travel path on which the vehicle is to travel in the future; generate the travel path on the basis of the center of the travel path; and set the predetermined width on the basis of a smaller width out of a width between the first left road lane marking and the first right road lane marking and a width between the second left road lane marking and the second right road lane marking.

According to the aspects (1) to (7), vehicle travel control can be performed more appropriately.

DESCRIPTION OF EMBODIMENTS

Hereinafter, embodiments of a vehicle control device, vehicle control method, and storage medium of the present invention will be described with reference to the drawings.

Overall Configuration

Figure 1:
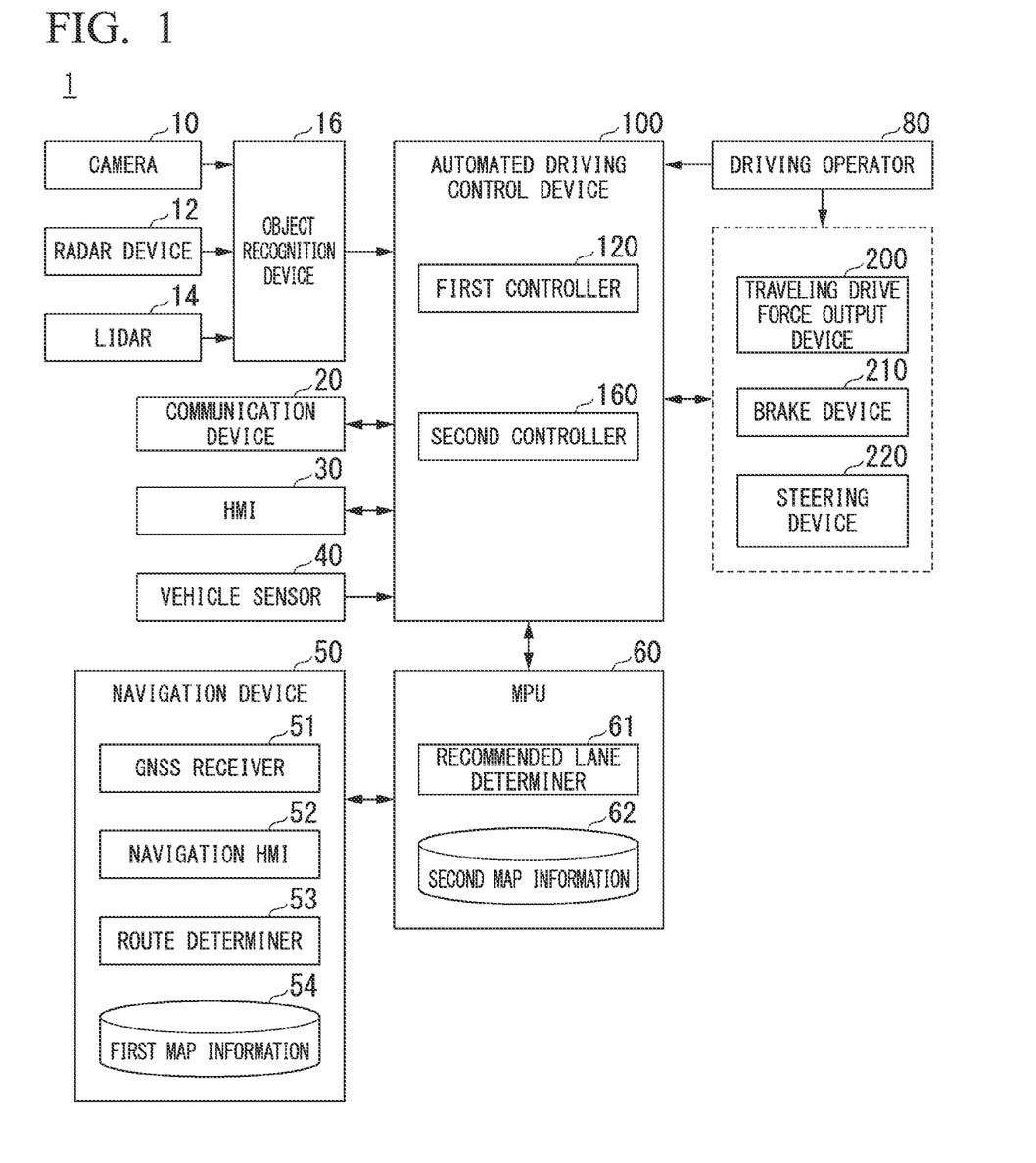
FIG. 1 is a configuration diagram of a vehicle system using a vehicle control device according to an embodiment.

FIG. 1 is a configuration diagram of a vehicle system 1 using a vehicle control device according to an embodiment. A vehicle having the vehicle system 1 mounted therein is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 1 includes, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The devices and the apparatuses are connected to each other via a multiplex communication line such as a Controller Area Network (CAN) communication line, a serial communication line, or a wireless communication network. The configuration shown in FIG. 1 is only an example, and some of the constituents may be omitted, and other constituents may be added.

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) in which the vehicle system 1 is mounted. For example, in a case of imaging the front in the own vehicle M, the camera 10 is attached to the upper part of a front windshield, the back surface of a rearview mirror, or the like. The camera 10 periodically and repeatedly captures images of the surroundings of the own vehicle M. The camera 10 may be a stereo camera.

The radar device 12 radiates electric waves such as millimeter waves in the surroundings of the own vehicle M, detects electric waves (reflected waves) reflected by an object, and thus detects at least a position of (a distance to and an azimuth of) the object. The radar device 12 is attached at any location in the own vehicle M. The radar device 12 may detect a position and a speed of an object according to a frequency modulated continuous wave (FM-CW) method.

The LIDAR 14 applies light (or an electromagnetic wave with a wavelength close to that of the light) in the surroundings of the own vehicle M, and measures scattered light. The LIDAR 14 detects a distance to a target on the basis of a time from light emission to light reception. The applied light is, for example, pulsed laser light. The LIDAR 14 is attached at any location in the own vehicle M.

The object recognition device 16 performs a sensor fusion process on detection results from some or all of the camera 10, the radar device 12, and the LIDAR 14, and thus recognizes a position, the type, a speed, and the like of an object. The object recognition device 16 outputs a recognition result to the automated driving control device 100. The object recognition device 16 may output detection results from the camera 10, the radar device 12, and the LIDAR 14 to the automated driving control device 100 without change. The object recognition device 16 may be omitted from the vehicle system 1.

The communication device 20 performs communication with another vehicle present in the surroundings of the own vehicle M, or performs communication with various server apparatuses via a wireless base station by using, for example, a cellular network, a Wi-Fi network, Bluetooth (registered trademark), or dedicated short range communication (DSRC).

The HMI 30 presents various types of information to an occupant of the own vehicle M, and also receives an input operation from the occupant. The HMI 30 includes various display devices, speakers, buzzers, touch panels, switches, keys, and the like.

The vehicle sensor 40 includes a vehicle speed sensor that detects a speed of the own vehicle M, an acceleration sensor that detects acceleration, a gyro sensor that detects angular velocity, an azimuth sensor that detects an orientation of the own vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 specifies a position of the own vehicle M on the basis of a signal received from the GNSS satellite. A position of the own vehicle M may be specified or complemented by an inertial navigation system (INS) using an output from the vehicle sensor 40. The navigation HMI 52 includes a display device, a speaker, a touch panel, keys, and the like. The navigation HMI 52 may be partially or entirely integrated into the HMI 30 described above. The route determiner 53 determines, for example, a route (hereinafter, a route on a map) from a position of the own vehicle M specified by the GNSS receiver 51 (or any entered position) to a destination that is entered by an occupant by using the navigation HMI 52 on the basis of the first map information 54. The first map information 54 is, for example, information in which a road shape is expressed by a link indicating a road and nodes connected to each other via the link. The first map information 54 may include a curvature of a road, point of interest (POI) information, and the like. The route on the map is output to MPU 60. The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determiner 61, and stores second map information 62 in a storage device such as an HDD or a flash memory. The recommended lane determiner 61 divides the route on the map provided from the navigation device 50 into a plurality of blocks (for example, divides the route on the map every 100 m in a vehicle advancing direction), and determines a recommended lane for each block by referring to the second map information 62. The recommended lane determiner 61 determines in which lane from the left the own vehicle will travel. In a case where there is a branch location on the route on the map, the recommended lane determiner 61 determines a recommended lane such that the own vehicle M can travel on a reasonable route to advance to a branch destination.

The second map information 62 is map information with higher accuracy than the first map information 54. The second map information 62 includes, for example, information regarding the center of a lane or information regarding a boundary of the lane. The second map information 62 may include road information, traffic regulation information, address information (address/postal code), facility information, telephone number information, information regarding prohibited sections in which a mode A or a mode B that will be described later is prohibited. The second map information 62 may be updated at any time by the communication device 20 performing communication with other devices.

The driving operator 80 includes, for example, an accelerator pedal, a brake pedal, a shift lever, a steering wheel, an odd-shaped steering wheel, a joystick, and other operators. A sensor that detects an amount of operation or the presence or absence of operation is attached to the driving operator 80, and a detection result from the sensor is output to the automated driving control device 100, or is output to some or all of the traveling drive force output device 200, the brake device 210, and the steering device 220.

The automated driving control device 100 includes, for example, a first controller 120 and a second controller 160. Each of the first controller 120 and the second controller 160 is realized, for example, by a hardware processor such as a central processing unit (CPU) executing a program (software). One or both of these constituents may be realized by hardware (a circuit portion; including circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) of the automated driving control device 100, and may be stored in an attachable and detachable storage medium such as a DVD or a CD-ROM and may be installed in an HDD or a flash memory of the automated driving control device 100 when the storage medium (non-transitory storage medium) is attached to a drive device. The automated driving control device 100 is an example of a "vehicle control device", and a combination of the action plan generator 140 and the second controller 160 is an example of a "driving controller".

Figure 2:
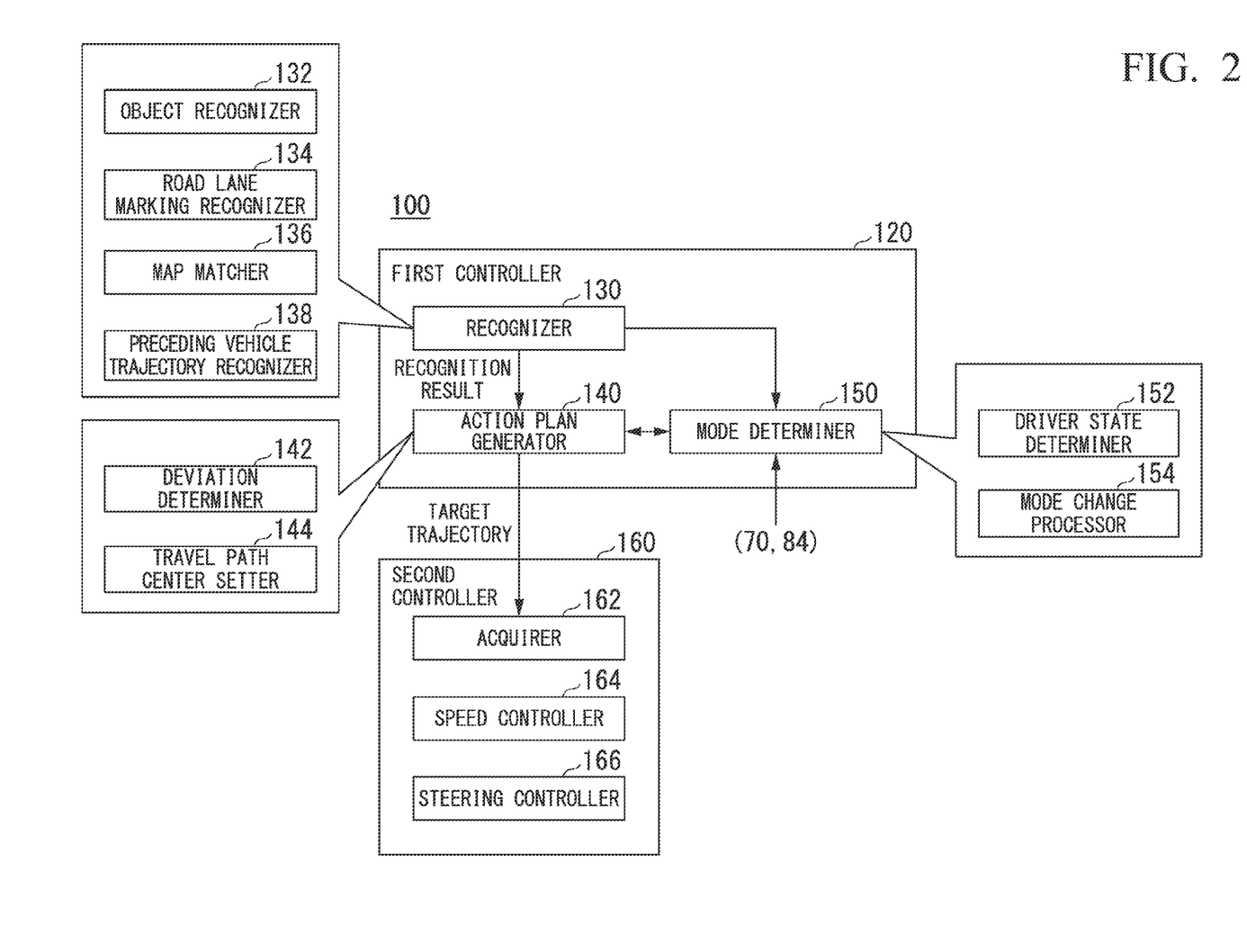
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and a mode determiner 150. The first controller 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel, and scoring and comprehensively evaluating both of recognition results. Consequently, the reliability of automated driving is ensured.

The recognizer 130 includes, for example, an object recognizer 132, a road lane marking recognizer 134, a map matcher 136, and a preceding vehicle trajectory recognizer 138. The road lane marking recognizer 134 is an example of a "first recognizer", the map matcher 136 is an example of a "second recognizer", and the preceding vehicle trajectory recognizer 138 is an example of a "third recognizer".

The object recognizer 132 recognizes states such as a position, a speed, and an acceleration of an object present in the surroundings of the own vehicle M on the basis of information input from the camera 10, the radar device 12, and the LIDAR 14 via the object recognition device 16. The position of the object is recognized as, for example, a position on absolute coordinates with a representative point (for example, the centroid or the drive axis center) of the own vehicle M as the origin, and is used for control. The position of the object may be represented by a representative point such as the centroid or a corner of the object, and may be represented by a region. The "states" of the object may include an acceleration, a jerk, or an "action state" of the object (for example, whether or not the object is changing lanes or trying to change lanes).

The road lane marking recognizer 134 extracts edge points having a large luminance difference from adjacent pixels in an image output by the camera 10, and recognizes a pair of left and right road lane markings in the image by connecting the edge points. In this case, the road lane marking recognizer 134 recognizes the left and right road lane markings as coordinates in a vehicle coordinate system in which a representative point of the own vehicle is set to the origin, a vehicle center axis is set to an X axis, and an axis orthogonal to the vehicle center axis is set to a Y axis.

The map matcher 136 collates a position of the own vehicle M specified by the navigation device 50, an image captured by the camera 10, an output from an azimuth sensor included in the vehicle sensor 40, and the like with the second map information 62, and recognizes on which road and in which lane the own vehicle M is traveling on the map. The map matcher 136 further recognizes a pair of left and right road lane markings that divides a lane in which the own vehicle M is located on the basis of the second map information 62. In this case, the map matcher 136 recognizes the a pair of left and right road lane markings as coordinates in the vehicle coordinate system, similarly to the road lane marking recognizer 134. The map matcher 136 integrates the a pair of left and right road lane markings recognized by the road lane marking recognizer 134 with the a pair of left and right road lane markings recognized by itself in the vehicle coordinate system. Details of these four road lane markings will be described later with reference to FIG. 4.

The preceding vehicle trajectory recognizer 138 determines whether or not there is a preceding vehicle of the own vehicle M on the basis of an image output by the camera 10, and in a case where it is determined that there is the preceding vehicle of the own vehicle M, acquires a traveling trajectory of the preceding vehicle as coordinate points in the vehicle coordinate system.

The action plan generator 140 generates target trajectories in which the own vehicle M automatedly (regardless of an operation of a driver) travels in the future such that the own vehicle can travel in a recommended lane determined by the recommended lane determiner 61 in principle and can also cope with a surrounding situation of the own vehicle M. The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, any of about 0.1 to 0.9 seconds) are generated as parts of the target trajectory. A trajectory point may be a position to be reached by the own vehicle M at a sampling time point every predetermined sampling time. In this case, the information of the target velocity and the target acceleration is expressed by the interval of the trajectory points. The action plan generator 140 includes a deviation determiner 142 and a travel path center setter 144, and these functions will be described later.

The mode determiner 150 determines a driving mode of the own vehicle M to be one of a plurality of driving modes in which tasks imposed on a driver are different. The mode determiner 150 includes, for example, a driver state determiner 152 and a mode change processor 154. These individual functions will be described later.

Figure 3:
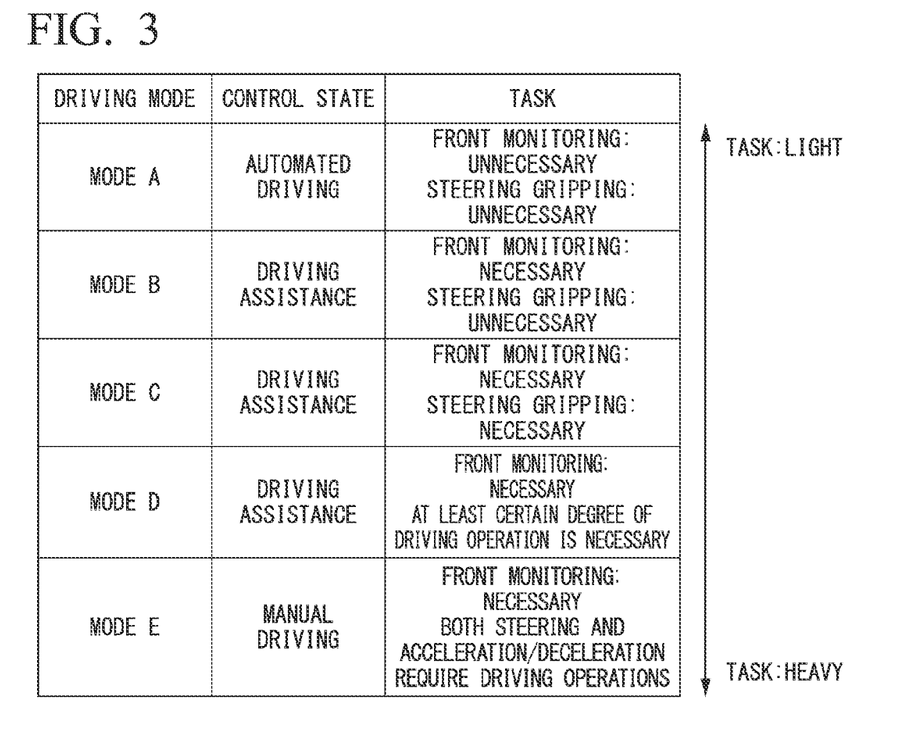
FIG. 3 is a diagram showing an example of a correspondence relationship between a driving mode, a control state of an own vehicle M, and a task.

FIG. 3 is a diagram showing an example of a correspondence relationship between a driving mode, a control state of the own vehicle M, and a task. Driving modes of the own vehicle M include, for example, five modes from a mode A to a mode E. A control state, that is, the degree of automation of driving control for the own vehicle M is highest in the mode A, then becomes lower in the order of the mode B, the mode C, and the mode D, and is lowest in the mode E. In contrast, a task imposed on a driver is lightest in the mode A, then becomes heavier in the order of the mode B, the mode C, and the mode D, and is heaviest in the mode E. In the modes D and E, the vehicle is in a control state that is not automated driving, and thus the automated driving control device 100 is responsible for finishing control related to automated driving and transitioning to driving assistance or manual driving. Hereinafter, details of each driving mode will be exemplified.

In the mode A, the vehicle is in an automated driving state, and neither front monitoring nor gripping of the steering wheel 82 (steering gripping in the figure) is imposed on the driver. However, even in the mode A, the driver is required to be in a posture to quickly transition to manual driving in response to a request from the system centered on the automated driving control device 100. The term "automated driving" referred to here means that both steering and acceleration/deceleration are controlled without depending on the driver's operation. The term "front" means a space in an advancing direction of the own vehicle M that is visually recognized through the front windshield. The mode A is a driving mode that is executable in a case of satisfying a condition that the own vehicle M is traveling at a predetermined speed (for example, about 50 [km/h]) or less on a motorway such as an expressway and there is a preceding vehicle that is a following target, and may be referred to as traffic jam pilot (TJP). In a case where this condition is no longer satisfied, the mode determiner 150 changes a driving mode of the own vehicle M to the mode B.

In the mode B, the vehicle is in a driving assistance state, and the task of monitoring the front in the own vehicle M (hereinafter, front monitoring) is imposed on the driver, but the task of gripping the steering wheel 82 is not imposed on the driver. In the mode C, the vehicle is in a driving assistance state, and the task of front monitoring and the task of gripping the steering wheel 82 are imposed on the driver. The mode D is a driving mode that requires a certain degree of driving operation by the driver with respect to at least one of steering and acceleration/deceleration of the own vehicle M. For example, in the mode D, driving assistance such as adaptive cruise control (ACC) or lane keeping assist system (LKAS) is provided. In the mode E, the vehicle is in a manual driving state in which both steering and acceleration/deceleration require driving operations by the driver. In both the mode D and the mode E, the task of monitoring the front in the own vehicle M is naturally imposed on the driver.

The mode determiner 150 changes a driving mode of the own vehicle M to a driving mode in which the task is heavier in a case where the task related to the determined driving mode (hereinafter, the current driving mode) is not executed by the driver.

For example, in the mode A, in a case where the driver is in a posture where the driver cannot transition to manual driving in response to a request from the system (for example, in a case where the driver continues to look outside a permissible area or a sign that driving becomes difficult is detected), the mode determiner 150 uses the HMI 30 to prompt the driver to transition to manual driving, and if the driver does not respond, the mode determiner 150 performs control of gradually bringing the own vehicle M to a road shoulder and stopping the own vehicle M to stop the automated driving. After the automated driving is stopped, the own vehicle is in the mode D or E, and the own vehicle M can be started by a manual operation of the driver. Hereinafter, the same applies to "stop automated driving". In a case where the driver is not monitoring the front in the mode B, the mode determiner 150 uses the HMI 30 to prompt the driver to monitor the front, and if the driver does not respond, the mode determiner 150 performs control of gradually bringing the own vehicle M to a road shoulder and stopping the own vehicle M to stop the automated driving. In the mode C, in a case where the driver is not monitoring the front or is not gripping the steering wheel 82, the mode determiner 150 uses the HMI 30 to prompt the driver to monitor the front and/or grip the steering wheel 82, and if the driver does not respond, the mode determiner 150 performs control of gradually bringing the own vehicle M to a road shoulder and stopping the own vehicle M to stop the automated driving.

The driver state determiner 152 monitors a state of the driver in order to perform the above mode change, and determines whether or not the state of the driver is a state corresponding to a task. For example, the driver state determiner 152 analyzes an image captured by a driver monitor camera 70 to estimate a posture of the driver, and determines whether or not the driver is in a posture to be unable to transition to manual driving in response to a request from the system. The driver state determiner 152 analyzes the image captured by the driver monitor camera 70 and performs a line-of-sight estimation process, and thus determines whether or not the driver is monitoring the front.

The mode change processor 154 performs various processes for a mode change. For example, the mode change processor 154 instructs the action plan generator 140 to generate a target trajectory for stopping at a road shoulder, gives an operation instruction to a driving assistance device (not shown), or controls the HMI 30 in order to prompt the driver to perform an action.

The second controller 160 controls the traveling drive force output device 200, the brake device 210, and the steering device 220 such that the own vehicle M can pass along the target trajectory generated by the action plan generator 140 as scheduled.

Referring to FIG. 2 again, the second controller 160 includes, for example, an acquirer 162, a speed controller 164, and a steering controller 166. The acquirer 162 acquires information regarding the target trajectory (trajectory points) generated by the action plan generator 140, and stores the information in a memory (not shown). The speed controller 164 controls the traveling drive force output device 200 or the brake device 210 on the basis of a speed element included in the target trajectory stored in the memory. The steering controller 166 controls the steering device 220 according to a curved state of the target trajectory stored in the memory. Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second controller 160 or information being input from the driving operator 80, so that brake torque corresponding to a braking operation is output to each vehicle wheel. The brake device 210 may include, as a backup, a mechanism transmitting hydraulic pressure generated by operating the brake pedal included in the driving operator 80, to the cylinder via a master cylinder. The brake device 210 is not limited to the above configuration and may be an electronic control type hydraulic brake device that controls an actuator according to information being input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second controller 160 or information being input from the driving operator 80, so that an orientation of the turning wheel is changed.

Operation

Figure 4:
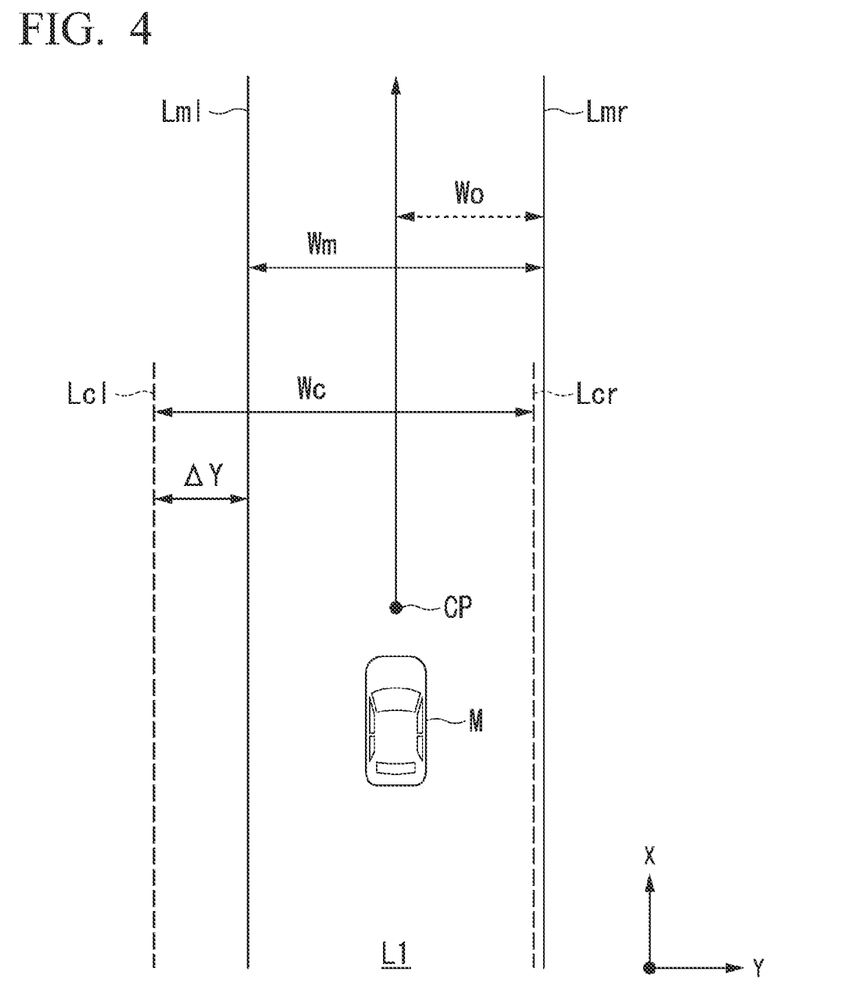
FIG. 4 is a diagram for describing an outline of an operation of the vehicle control device of the present embodiment.

Hereinafter, an operation of the vehicle control device of the present embodiment will be described with reference to FIG. 4. In the present embodiment, it is assumed that the own vehicle M is traveling in the mode B as a driving mode. FIG. 4 is a diagram for describing an outline of the operation of the vehicle control device of the present embodiment. In FIG. 4, L1 indicates a lane in which the own vehicle M is traveling, a dotted line Lcl indicates a position of a left road lane marking (hereinafter, referred to as a "first left road lane marking") with respect to the own vehicle M recognized on the basis of an image captured by the camera 10 in the vehicle coordinate system, a dotted line Lcr indicates a position of a right road lane marking (hereinafter, referred to as a "first right road lane marking") with respect to the own vehicle M recognized on the basis of the image captured by the camera 10 in the vehicle coordinate system, a thick solid line Lml indicates a position of a left road lane marking (hereinafter, referred to as a "second left road lane marking") with respect to the own vehicle M indicated by the second map information 62 in the vehicle coordinate system, and a thick solid line Lmr indicates a position of a right road lane marking (hereinafter, referred to as a "second right road lane marking") with respect to the own vehicle M indicated by the second map information 62 in the vehicle coordinate system. Hereinafter, in a case where the left side and the right side are not differentiated, a road lane marking of the own vehicle M indicated by the camera 10 may be expressed as Lc, and a road lane marking of the own vehicle M indicated by the second map information 62 may be expressed as Lm.

The deviation determiner 142 determines whether or not there is a deviation between the first left road lane marking Lcl and the second left road lane marking Lml, and also determines whether or not there is a deviation between the first right road lane marking Lcr and the second right road lane marking Lmr. Specifically, the deviation determiner 142 determines whether or not a deviation amount of a lateral distance $\Delta Y1$ between the first left road lane marking Lcl and the second left road lane marking Lml, an angle $\Delta\theta 1$ between the first left road lane marking Lcl and the second left road lane marking Lml, a lateral distance $\Delta Yr$ between the first right road lane marking Lcr and the second right road lane marking Lmr, or an angle $\Delta\theta r$ between the first right road lane marking Lcr and the second right road lane marking Lmr is equal to or more than a threshold value, and in a case where it is determined that the lateral distance $\Delta Y1$, the angle $\Delta\theta 1$, the lateral distance $\Delta\theta Yr$, or the angle $\Delta\theta r$ is equal to or more than the threshold value, determines that there is a deviation. Hereinafter, in a case where the left side and the right side are not differentiated, the angle $\Delta\theta 1$ or the angle $\Delta\theta r$ may be expressed as an angle $\Delta\theta$, and the lateral distance $\Delta Y1$ or the lateral distance $\Delta Yr$ may be expressed as a lateral distance $\Delta Y$.

In a case where the deviation determiner 142 determines that there is a deviation with respect to only one of a pair of the first left road lane marking Lcl and the second left road lane marking Lml and a pair of the first right road lane marking Lcr and the second right road lane marking Lmr, the travel path center setter 144 sets a position at which a predetermined width Wo is offset to the one pair from the other of the pair of the first left road lane marking Lcl and the second left road lane marking Lml and the pair of the first right road lane marking Lcr and the second right road lane marking Lmr as the center CP of a travel path on which the own vehicle M is to travel in the future. In this case, the travel path center setter 144 sets the predetermined width Wo on the basis of a smaller width out of a width Wc between the first left road lane marking Lcl and the first right road lane marking Lcr, and a width Wm between the second left road lane marking Lml and the second right road lane marking Lmr. Specifically, the travel path center setter 144 sets the predetermined width Wo to ½ of the smaller width out of the width Wc and the width Wm. That is, Wo=½× min(Wc, Wm) is established. Therefore, the action plan generator 140 generates a target trajectory such that the center of the own vehicle M passes through the center CP of the set travel path. Consequently, even in a case where a deviation occurs in the recognition of the road lane markings for one of the left and right pairs, automated driving in the mode B can be continued on the basis of the other pair in which a deviation does not occur in the recognition of the road lane markings.

On the other hand, in a case where it is determined that there is a deviation in both the pair of the first left road lane marking Lcl and the second left road lane marking Lml and the pair of the first right road lane marking Lcr and the second right road lane marking Lmr, the deviation determiner 142 causes the mode determiner 150 to change the driving mode from the mode B to the mode C (or a driving mode in which a task is heavier) without causing the travel path center setter 144 to set the center CP of a travel path. Consequently, in a case where a deviation occurs in the recognition of the road lane markings for both the left and right pairs, safety can be ensured by changing the driving mode to a driving mode in which a task is heavier.

In a case where is determined that there is no deviation for the pair of the first left road lane marking Lcl and the second left road lane marking Lml and the pair of the first right road lane marking Lcr and the second right road lane marking Lmr, since the road lane markings are recognized normally, the mode determiner 150 continues the driving mode of the mode B.

Figure 5:
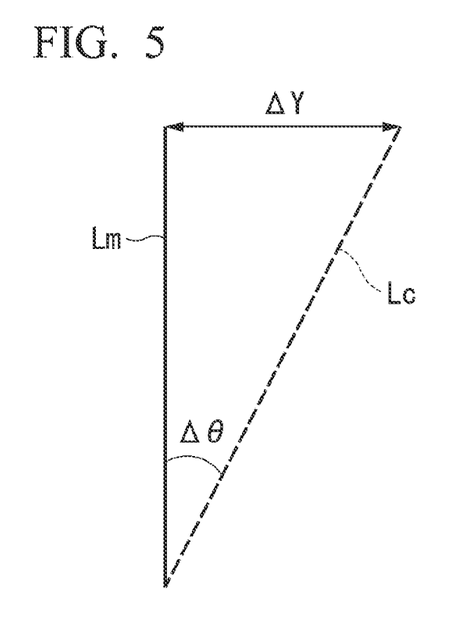
FIG. 5 is a diagram showing an example of a deviation amount measured for determination of a deviation determiner.

FIG. 5 is a diagram showing an example of a deviation amount measured for determination by the deviation determiner 142. As shown in FIG. 5, the deviation determiner 142 calculates the lateral distance $\Delta Y$ between the road lane marking Lc and the road lane marking Lm on the basis of the road lane marking Lc and the road lane marking Lm recognized by the recognizer 130, and also calculates the angle $\Delta\theta$ between the road lane marking Lc and the road lane marking Lm recognized by the recognizer 130. Here, the road lane marking Lc and the road lane marking Lm that are calculation targets of the lateral distance $\Delta\theta$ and the angle $\Delta\theta$ are the road lane marking Lc and the road lane marking Lm within a predetermined distance (for example, 30 m) from the own vehicle M. In a case where the road lane marking Lc and the road lane marking Lm recognized by the recognizer 130 are curves instead of straight lines, the deviation determiner 142 may approximate the curves to straight lines and then calculate the lateral distance $\Delta Y$ and the angle $\Delta\theta$.

Figure 6:
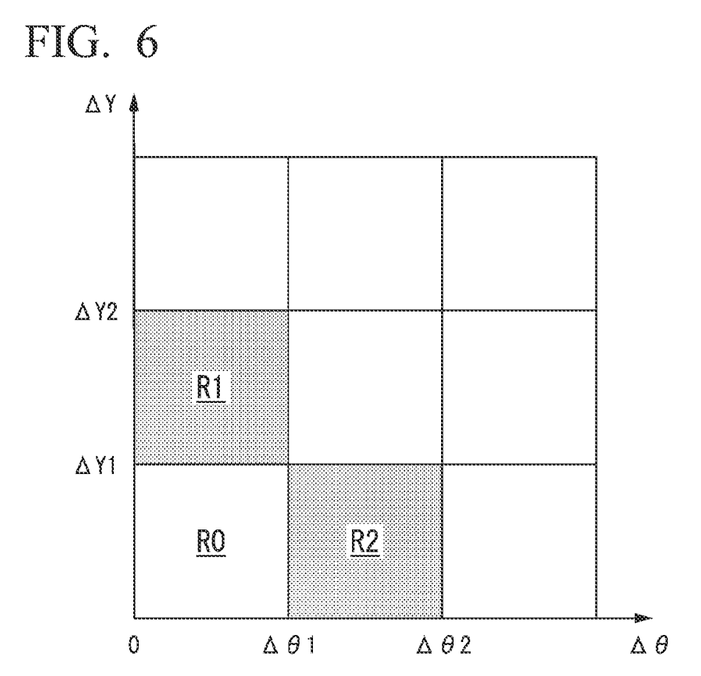
FIG. 6 is a diagram showing an example of a threshold value used for determination of the deviation determiner.

The deviation determiner 142 compares the calculated lateral distance $\Delta Y$ and angle $\Delta\theta$ with threshold values, respectively. FIG. 6 is a diagram showing an example of a threshold value used for determination by the deviation determiner 142. As shown in FIG. 6, the deviation determiner 142 determines whether or not the lateral distance $\Delta Y$ is a first threshold value $\Delta Y1$ or more and a second threshold value $\Delta Y2$ or less, and the angle $\Delta\theta$ is a third threshold value $\Delta\theta 1$ or more and a fourth threshold value $\Delta\theta 2$ or less.

When a combination of the lateral distance $\Delta Y$ and the angle $\Delta\theta$ is within a range of a region R1 in which the lateral distance $\Delta Y$ is the first threshold value $\Delta\theta 1$ or more and the second threshold value $\Delta Y2$ or less, and the angle $\Delta\theta$ is 0 or more and the third threshold value $\Delta\theta 1$ or less, or is within a range of a region R2 in which the lateral distance $\Delta Y$ is 0 or more and the first threshold value $\Delta Y1$ or less and the angle $\Delta\theta$ is the third threshold value $\Delta\theta 1$ or more and the fourth threshold value $\Delta\theta 2$ or less, the deviation determiner 142 determines that there is a deviation, and causes the travel path center setter 144 to set the center CP of a travel path.

Since a region R0 in which the lateral distance ΔY is 0 or more and the first threshold value Δθ1 or less and the angle Δθ is 0 or more and the third threshold value Δθ1 or less is a normal region, the deviation determiner 142 determines that there is no deviation when the combination of the lateral distance ΔY and the angle Δθ is within the range of the region R0. When the combination of the lateral distance ΔY and the angle Δθ is outside the range of the region R0, the region R1, and the region R2, the deviation determiner 142 determines that a deviation is present, but changes the driving mode from the mode B to the mode C (or a driving mode in which a task is heavier) instead of causing the travel path center setter 144 to set the center CP of a travel path. Consequently, even in a case where a deviation occurs in the recognition of the road lane markings for one of the left and right pairs, automated driving in the mode B can be continued on the basis of the other pair for which a deviation does not occur in the recognition of the road lane markings, and when an occurring deviation is excessive (that is, the lateral distance ΔY is more than the second threshold value ΔY2, or the angle Δθ is more than the fourth threshold value Δθ2), the driving mode is changed to a driving mode in which a task is heavier. Therefore, safety can be ensured.

In the above description, the first threshold value ΔY1, the second threshold value ΔY2, the third threshold value Δθ1, and the fourth threshold value Δθ2 are described as constants, but in the present embodiment, the deviation determiner 142 sets these threshold values on the basis of an amount of change in curvature of the first left road lane marking Lcl or the first right road lane marking Lcl. Here, an amount of change in curvature means a rate of change over time in the curvature R in front X [m] of the road lane marking Lc indicated by the camera 10, and may be calculated, for example, by representing a position in front X [m] from the own vehicle M on the road lane marking Lc as a polynomial, differentiating the polynomial twice with respect to X, and then further differentiating with respect to time t. As described above, by setting the threshold value according to the amount of change in curvature of the road lane marking detected by the camera 10, it is possible to more flexibly determine a deviation in recognition of the road lane marking.

Figure 7:
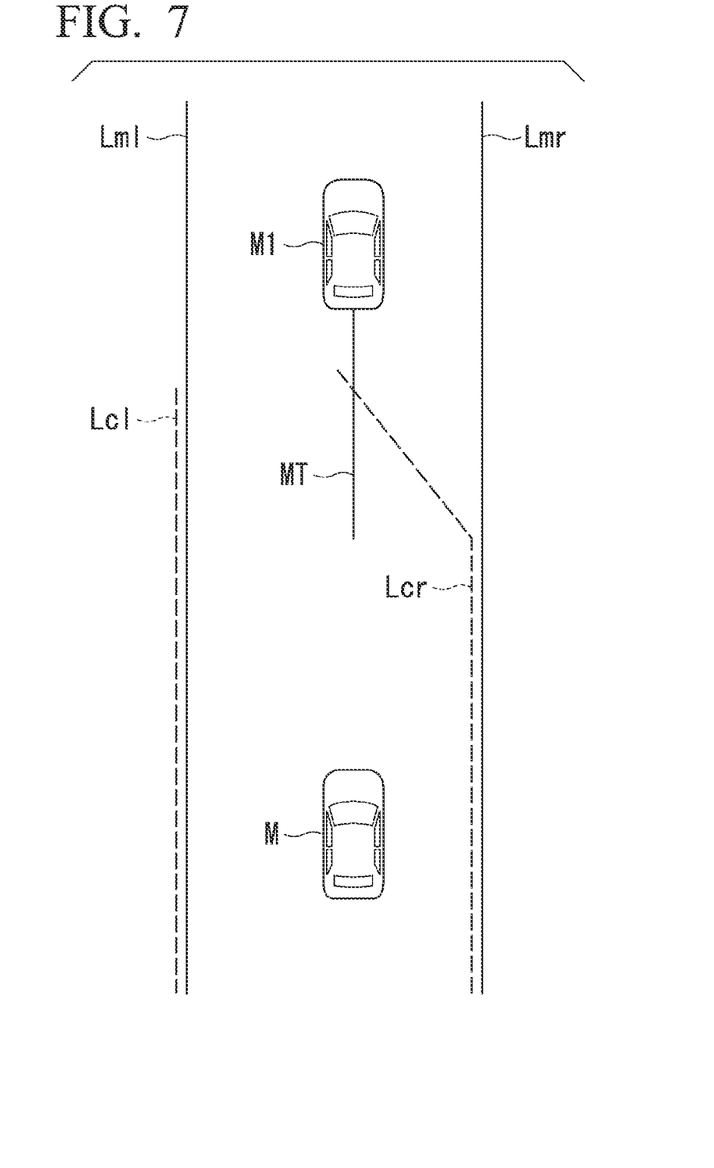
FIG. 7 is a diagram for describing an outline of an exception process by the vehicle control device of the present embodiment.

Next, with reference to FIG. 7, an exception process by the vehicle control device of the present embodiment will be described. FIG. 7 is a diagram for describing an outline of an exception process by the vehicle control device of the present embodiment. In FIG. 7, M1 indicates a preceding vehicle of the own vehicle M, and MT indicates a traveling trajectory of the preceding vehicle M1. The deviation determiner 142 determines whether or not the traveling trajectory MT recognized by the recognizer 130 intersects the first left road lane marking Lcl or the first right road lane marking Lcr, and, in a case where it is determined that the traveling trajectory MT recognized by the recognizer 130 intersects the first left road lane marking Lcl or the first right road lane marking Lcr, the mode determiner 150 changes a driving mode from the mode B to the mode C (or a driving mode in which a task is heavier) regardless of a deviation determination result by the deviation determiner 142. This is so that, in a case where the traveling trajectory MT intersects the first left road lane marking Lcl or the first right road lane marking Lcr, the recognition accuracy of the camera 10 may be significantly low, and thus an occupant of the own vehicle M is alerted by changing the driving mode to a driving mode in which a task is heavier. In FIG. 7, since the traveling trajectory MT intersects the first right road lane marking Lcr, the mode determiner 150 changes the driving mode from the mode B to the mode C (or a driving mode in which a task is heavier) regardless of a determination result by the deviation determiner 142.

Figure 8:
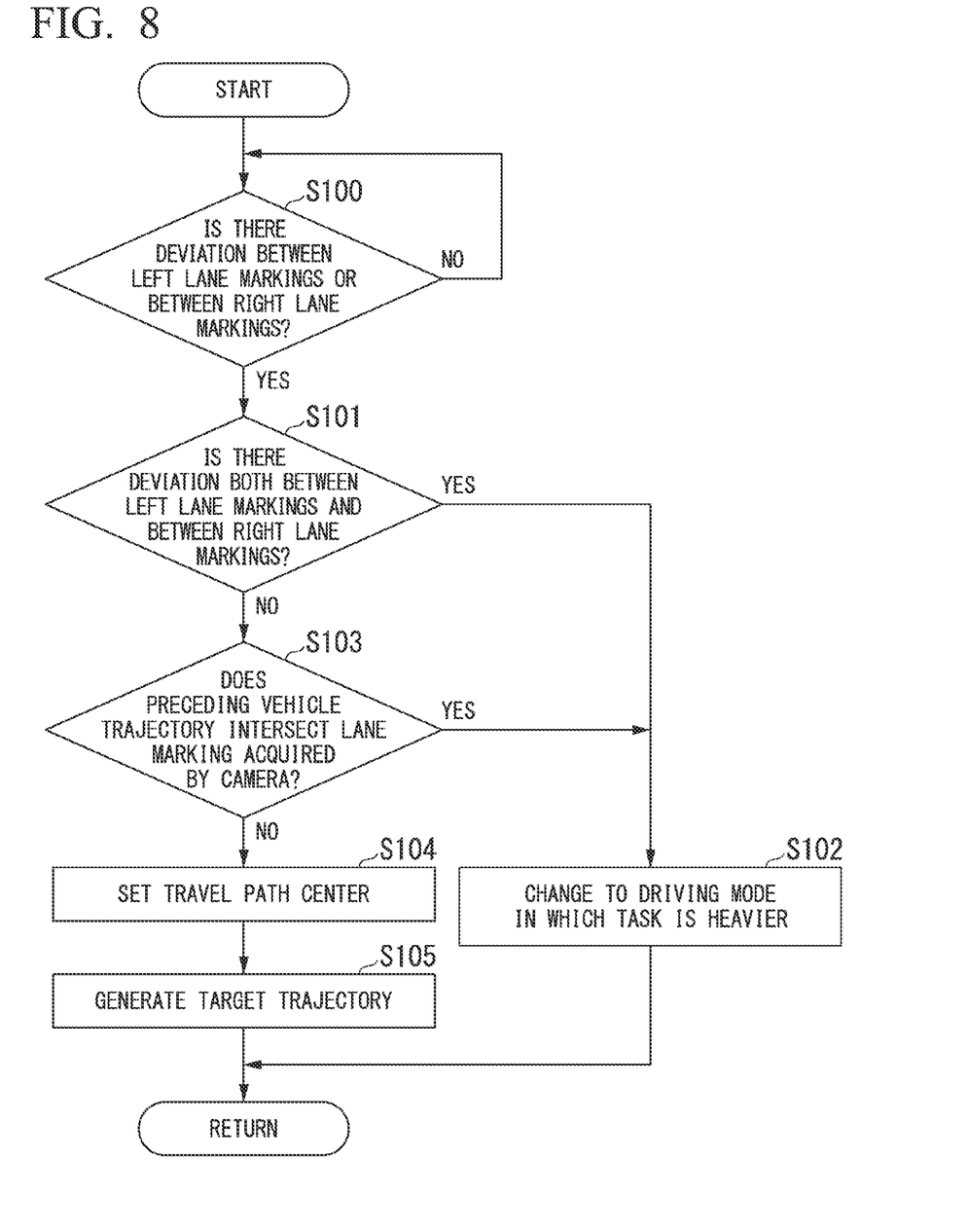
FIG. 8 is a flowchart showing an example of a flow of an operation of the vehicle control device of the present embodiment.

Next, with reference to FIG. 8, a flow of an operation of the vehicle control device of the present embodiment will be described. FIG. 8 is a flowchart showing an example of a flow of an operation of the vehicle control device of the present embodiment. The process in this flowchart is repeatedly executed while the own vehicle M is traveling in the mode B.

First, the deviation determiner 142 determines whether there is a deviation between the first left road lane marking Lcl and the second left road lane marking Lml, or a deviation between the first right road lane marking Lcr and the second right road lane marking Lmr (step S100).

In a case where it is determined that there is no deviation between the first left road lane marking Lcl and the second left road lane marking Lml, or there is no deviation between the first right road lane marking Lcr and the second right road lane marking Lmr, the deviation determiner 142 executes the process in step S100 again.

On the other hand, in a case where it is determined that there is a deviation between the first left road lane marking Lcl and the second left road lane marking Lml, or there is a deviation between the first right road lane marking Lcr and the second right road lane marking Lmr, the deviation determiner 142 then determines whether or not there is a deviation both between the first left road lane marking Lcl and the second left road lane marking Lml and between the first right road lane marking Lcr and the second right road lane marking Lmr (step S101). In a case where it is determined that there is a deviation both between the first left road lane marking Lcl and the second left road lane marking Lml and between the first right road lane marking Lcr and the second right road lane marking Lmr, the mode determiner 150 changes the driving mode from the mode B to the mode C (or a driving mode in which a task is heavier).

On the other hand, in a case where it is determined that there is no deviation either between the first left road lane marking Lcl and the second left road lane marking Lml or between the first right road lane marking Lcr and the second right road lane marking Lmr, the deviation determiner 142 determines whether or not the traveling trajectory MT of the preceding vehicle M1 recognized by the recognizer 130 intersects the first left road lane marking Lcl or the first right road lane marking Lcr (step S103). In a case where it is determined that the traveling trajectory MT of the preceding vehicle M1 recognized by the recognizer 130 intersects the first left road lane marking Lcl or the first right road lane marking Lcr, the mode determiner 150 changes the driving mode from the mode B to the mode C (or a driving mode in which a task is heavier).

On the other hand, in a case where it is determined that the traveling trajectory MT of the preceding vehicle M1 recognized by the recognizer 130 does not intersect with the first left road lane marking Lcl or the first right road lane marking Lcr, the travel path center setter 144 sets the predetermined width Wo on the basis of a smaller width out of the width We between the first left road lane marking Lcl and the first right road lane marking Lcr and the width Wm between the second left road lane marking Lml and the second right road lane marking Lmr, and sets a position at which the predetermined width Wo is offset from the lane marking for which it is determined that there is no deviation to the other lane marking as the center CP of a travel path on which the own vehicle M is to travel in the future (step S104). Next, the action plan generator 140 generates a target trajectory such that the center of the own vehicle M passes through the set center CP of the travel path (step S105). Consequently, the process in this flowchart is finished.

According to the present embodiment described above, a pair of left and right road lane markings recognized by the camera 10 and a pair of left and right road lane markings indicated by the second map information 62 are compared with each other, and in a case where a deviation occurs only in one pair of road lane markings, a position at which a predetermined width is offset from the other pair of road lane markings is set as the center CP of a travel path on which the own vehicle M is to travel in the future, and a target trajectory is generated such that the own vehicle M will pass through the center CP. Consequently, vehicle travel control can be performed more appropriately.

The embodiment described above may be expressed as follows.

A vehicle control device including:

a storage device that stores a program; and a hardware processor, in which the hardware processor executes the program stored in the storage device to on the basis of an output from a detection device that detects a surrounding situation of a vehicle, recognize a pair of left and right road lane markings that divides a lane in which the vehicle is located, and output the left and right road lane markings as a first left road lane marking and a first right road lane marking, respectively, recognize a pair of left and right road lane markings that divides the lane in which the vehicle is located on the basis of map information, and output the left and right road lane markings as a second left road lane marking and a second right road lane marking, respectively, determine whether or not there is a deviation between the first left road lane marking and the second left road lane marking, and determine whether or not there is a deviation between the first right road lane marking and the second right road lane marking, in a case where it is determined that a deviation is present only in one of a pair of the first left road lane marking and the second left road lane marking and a pair of the first right road lane marking and the second right road lane marking, set a position at which a predetermined width is offset from the other of the pair of the first left road lane marking and the second left road lane marking and the pair of the first right road lane marking and the second right road lane marking to the one pair, as a center of a travel path on which the vehicle is to travel in the future, generate the travel path on the basis of the center of the travel path, and set the predetermined width on the basis of a smaller width out of a width between the first left road lane marking and the first right road lane marking and a width between the second left road lane marking and the second right road lane marking.

As mentioned above, the mode for carrying out the present invention has been described by using the embodiment, but the present invention is not limited to the embodiment, and various modifications and replacements may occur within the scope without departing from the spirit of the present invention.

What is claimed is:

1. A vehicle control device comprising:

a storage device that stores a program; and a hardware processor, wherein the hardware processor executes the program stored in the storage device to:

recognize a left road lane marking and a right road lane marking that identifies a lane in which a vehicle is located based on an output received from a camera that detects a surrounding situation of the vehicle, and output a left camera road lane marking and a right camera road lane marking as a first left road lane marking and a first right road lane marking;

recognize the left road lane marking and the right road lane marking based on map information, and output a left map road lane marking and a right map road marking as a second left road lane marking and a second right road lane marking;

determine whether or not there is a left deviation between the first left road lane marking and the second left road lane marking on a left side, and determine whether or not there is a right deviation between the first right road lane marking and the second right road lane marking on a right side;

in response to determining that only one of the left deviation and the right deviation is present, set a position at which a predetermined width value is offset from one of the first left road lane marking and the second left road lane marking, or the first right road marking and the second right road lane marking on the side with no deviation, as a center of a target travel path on which the vehicle is to travel in the future;

generate the target travel path based on the center of the target travel path;

set the predetermined width value based on a smaller width value based on a comparison of a first width value as measured between the first left road lane marking and the first right road lane marking and a second width value as measured between the second left road lane marking and the second right road lane marking;

control the vehicle to travel on the target travel path, wherein the hardware processor determines whether or not there is a left deviation based on a left deviation amount between the first left road lane marking and the second left road lane marking, and determines whether or not there is a right deviation based on a right deviation amount between the first right road lane marking and the second right road lane marking, wherein the left deviation amount relates to at least one of a lateral distance between the first left road lane marking and the second left road lane marking, and an angle between the first left road lane marking and the second left road lane marking, and wherein the right deviation amount relates to at least one of a lateral distance between the first right road lane marking and the second right road lane marking, and an angle between the first right road lane marking and the second right road lane marking, wherein the processor determines that there is a left deviation if the lateral distance between the first left road lane marking and the second left road marking is a first threshold value or more and a second threshold value or less, and the angle between the first left road lane marking and the second left road lane marking is a third threshold value or more and a fourth threshold value or less, and wherein the processor determines that there is a right deviation if the lateral distance between the first right road lane marking and the second right road lane marking is the first threshold value or more and the second threshold value or less, and the angle between the first right road lane marking and the second right road lane marking is the third threshold value or more and the fourth threshold value or less.

2. The vehicle control device according to claim 1, wherein the hardware processor determines the left deviation is present in a case where the left deviation amount is equal to or more than a threshold value, and wherein the hardware processor sets the threshold value based on an amount of change in curvature of the first left road lane marking or the first right road lane marking.

3. The vehicle control device according to claim 1, wherein the hardware processor controls steering and acceleration/deceleration of the vehicle regardless of an operation of a driver of the vehicle, wherein the hardware processor determines a driving mode of the vehicle as one of a plurality of driving modes including a first driving mode and a second driving mode, the second driving mode being a driving mode in which a task imposed on the driver requires attentive and inactive driver participation as compared with the first driving mode, some of a plurality of driving modes including at least the second driving mode being controlled by the hardware processor, wherein the hardware processor changes the driving mode of the vehicle to a driving mode in which the task requires attentive and active driver participation when the task related to the determined driving mode is not being executed by the driver, and wherein the hardware processor continues the second driving mode in a case where the driving mode of the vehicle is the second driving mode and the hardware processor generates the target travel path.

4. The vehicle control device according to claim 3, wherein the hardware processor recognizes a traveling trajectory of a preceding vehicle, and wherein, in a case where the traveling trajectory intersects the first left road lane marking or the first right road lane marking, the hardware processor changes the driving mode of the vehicle from the second driving mode to the first driving mode.

5. A vehicle control method to be executed by a computer mounted on a vehicle, the vehicle control method comprising:

recognizing a left camera road lane marking and a right camera road lane marking that identifies a lane in which the vehicle is located based on an output received from a camera that detects a surrounding situation of the vehicle, and outputting the left camera road lane marking and the right camera road lane marking as a first left road lane marking and a first right road lane marking;

recognizing a left map road lane marking and a right map road lane marking based on map information, and outputting the left map road lane marking and the right map road lane marking as a second left road lane marking and a second right road lane marking;

determining whether or not there is a left deviation between the first left road lane marking and the second left road lane marking on a left side, and determining whether or not there is a right deviation between the first right road lane marking and the second right road lane marking on a right side;

in response to determining that only one of the left deviation and the right deviation is present, setting a position at which a predetermined width value is offset from one of the first left road marking and the second left road marking on the side with no deviation as a center of a target travel path on which the vehicle is to travel in the future;

generating the target travel path based on the center of the target travel path;

setting the predetermined width value based on a smaller width value based on a comparison of a first width value as measured between the first left road lane marking and the first right road lane marking and a second width value as measured between the second left road lane marking and the second right road lane marking;

controlling the vehicle to travel on the target travel path;

determining whether or not there is a left deviation based on a left deviation amount between the first left road lane marking and the second left road lane marking;

determining whether or not there is a right deviation based on a right deviation amount between the first right road lane marking and the second right road lane marking, wherein the left deviation amount relates to at least one of a lateral distance between the first left road lane marking and the second left road lane marking an angle between the first left road lane marking and the second left road lane marking, and wherein the right deviation amount relates to at least one of a lateral distance between the first right road lane marking and the second right road lane marking, and an angle between the first right road lane marking and the second right road lane marking;

determining that there is a left deviation if the lateral distance between the first left road lane marking and the second left road marking is a first threshold value or more and a second threshold value or less, and the angle between the first left road lane marking and the second left road lane marking is a third threshold value or more and a fourth threshold value or less; and determining that there is a right deviation if the lateral distance between the first right road lane marking and the second right road lane marking is the first threshold value or more and the second threshold value or less, and the angle between the first right road lane marking and the second right road lane marking is the third threshold value or more and the fourth threshold value or less.

6. A non-transitory computer readable medium storing a program for causing a computer mounted on a vehicle to:

recognize a left road lane marking and right road lane marking that identifies a lane in which the vehicle is located based on an output received from a camera that detects a surrounding situation of the vehicle, and output a left camera road lane marking and a right camera road lane marking as a first left road lane marking and a first right road lane marking;

recognize the left road lane marking and the right road lane marking based on map information, and output a left map road lane marking and a right map road lane marking as a second left road lane marking and a second right road lane marking;

determine whether or not there is a left deviation between the first left road lane marking and the second left road lane marking on a left side, and determine whether or not there is a right deviation between the first right road lane marking and the second right road lane marking on the right side;

in response to determining that only one of the left deviation and the right deviation is present set a position at which a predetermined width value is offset from one of the first left road marking and the second left road marking, or the first right road marking and the second right road marking on the side with no deviation as a center of a target travel path on which the vehicle is to travel in the future;

generate the target travel path based on the center of the target travel path;

set the predetermined width value based on a smaller width value based on a comparison of a first width value as measured between the first left road lane marking and the first right road lane marking and a second width value as measured between the second left road lane marking and the second right road lane marking;

control the vehicle to travel on the target travel path;

determine whether or not there is a left deviation based on a left deviation amount between the first left road lane marking and the second left road lane marking;

determine whether or not there is a right deviation based on a right deviation amount between the first right road lane marking and the second right road lane marking, wherein the left deviation amount relates to at least one of a lateral distance between the first left road lane marking and the second left road lane marking an angle between the first left road lane marking and the second left road lane marking, and wherein the right deviation amount relates to at least one of a lateral distance between the first right road lane marking and the second right road lane marking, and an angle between the first right road lane marking and the second right road lane marking;

determine that there is a left deviation if the lateral distance between the first left road lane marking and the second left road marking is a first threshold value or more and a second threshold value or less, and the angle between the first left road lane marking and the second left road lane marking is a third threshold value or more and a fourth threshold value or less; and determine that there is a right deviation if the lateral distance between the first right road lane marking and the second right road lane marking is the first threshold value or more and the second threshold value or less, and the angle between the first right road lane marking and the second right road lane marking is the third threshold value or more and the fourth threshold value or less.

7. A vehicle control device comprising:
a storage device that stores a program; and
a hardware processor,
wherein the hardware processor executes the program stored in the storage device to:
  recognize a left road lane marking and a right road lane marking that identifies a lane in which a vehicle is located based on an output received from a camera that detects a surrounding situation of the vehicle, and output a left camera road lane marking and the right camera road lane marking as a first left road lane marking and a first right road lane marking;

recognize the left road lane marking and the right road lane marking based on map information, and output a left map road lane marking and a right map road lane marking as a second left road lane marking and a second right road lane marking;

recognize a traveling trajectory of a preceding vehicle;

determine whether or not there is a left deviation between the first left road lane marking and the second left road lane marking on a left side, and determine whether or not there is a right deviation between the first right road lane marking and the second right road lane marking on a right side;

in response to determining that only one of the left deviation and the right deviation is present and the recognized traveling trajectory is determined not to intersect the first left road lane marking or the first right road lane marking, set a position at which a predetermined width value is offset from one of the first left road lane marking and the second left road lane marking, or the first right road marking and the second right road lane marking on the side with no deviation, as a center of a target travel path on which the vehicle is to travel in the future;

generate the target travel path based on the center of the target travel path;

set the predetermined width value based on a smaller width value based on a comparison of a first width value as measured between the first left road lane marking and the first right road lane marking and a second width value as measured between the second left road lane marking and the second right road lane marking;

control the vehicle to travel on the target travel path;

determine whether or not there is a left deviation based on a left deviation amount between the first left road lane marking and the second left road lane marking;

determine whether or not there is a right deviation based on a right deviation amount between the first right road lane marking and the second right road lane marking, wherein the left deviation amount relates to at least one of a lateral distance between the first left road lane marking and the second left road lane marking an angle between the first left road lane marking and the second left road lane marking, and wherein the right deviation amount relates to at least one of a lateral distance between the first right road lane marking and the second right road lane marking, and an angle between the first right road lane marking and the second right road lane marking;

determine that there is a left deviation if the lateral distance between the first left road lane marking and the second left road marking is a first threshold value or more and a second threshold value or less, and the angle between the first left road lane marking and the second left road lane marking is a third threshold value or more and a fourth threshold value or less; and determine that there is a right deviation if the lateral distance between the first right road lane marking and the second right road lane marking is the first threshold value or more and the second threshold value or less, and the angle between the first right road lane marking and the second right road lane marking is the third threshold value or more and the fourth threshold value or less.

* * * * *